(12) United States Patent
DiCarlo et al.

(10) Patent No.: US 11,032,102 B2
(45) Date of Patent: Jun. 8, 2021

(54) BRIDGE BETWEEN COMMUNICATION NETWORKS

(71) Applicant: The Government of the United States, as represented by the Secretary of the Army, Washington, DC (US)

(72) Inventors: Robert DiCarlo, Bel Air, MD (US); Patrick Doyle, Baltimore, MD (US); Matthew Lazzaro, Churchville, MD (US); William Toth, Ocean, NJ (US); Rex Johnson, Perryville, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 55 days.

(21) Appl. No.: 16/459,681

(22) Filed: Jul. 2, 2019

(65) Prior Publication Data
US 2021/0006433 A1    Jan. 7, 2021

(51) Int. Cl.
*H04L 12/46* (2006.01)
*H04L 29/06* (2006.01)
*H04L 12/66* (2006.01)

(52) U.S. Cl.
CPC .............. *H04L 12/46* (2013.01); *H04L 12/66* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 5,974,142 A | * | 10/1999 | Heer | H04K 1/00 379/442 |
| 7,346,044 B1 | * | 3/2008 | Chou | H04L 12/66 370/352 |
| 10,362,035 B1 | * | 7/2019 | Corbett | H04L 63/102 |
| 10,362,046 B1 | * | 7/2019 | Srinivasan | H04L 63/1433 |
| 2001/0053207 A1 | * | 12/2001 | Jeon | H04M 7/0069 379/90.01 |
| 2001/0055311 A1 | * | 12/2001 | Trachewsky | H04L 1/0006 370/445 |
| 2005/0152347 A1 | * | 7/2005 | Chen | H04L 12/66 370/356 |
| 2007/0047526 A1 | * | 3/2007 | Kennedy | H04L 12/6418 370/353 |
| 2007/0280203 A1 | * | 12/2007 | Shaffer | H04L 12/66 370/352 |
| 2008/0052384 A1 | * | 2/2008 | Marl | H04L 41/0273 709/223 |
| 2008/0235514 A1 | * | 9/2008 | Walker | H04L 41/28 713/185 |
| 2009/0055514 A1 | * | 2/2009 | Tebbs | H04L 12/2807 709/220 |

(Continued)

*Primary Examiner* — Chi H Pham
*Assistant Examiner* — Vladislav Y Agureyev
(74) *Attorney, Agent, or Firm* — Ronald Krosky

(57) ABSTRACT

Various embodiments that pertain to a bridge between networks. There can be a desire for a first communication network to share messages with a second communication network. However, these networks can individually have their own security measures that make direct network-to-network communication difficult if not impossible. Therefore, a bridge can be created that allows for communication between the networks.

20 Claims, 12 Drawing Sheets

(56) References Cited

U.S. PATENT DOCUMENTS

| | | | |
|---|---|---|---|
| 2011/0239281 A1* | 9/2011 | Sovio | H04L 63/0815 |
| | | | 726/5 |
| 2012/0311657 A1* | 12/2012 | Boldyrev | H04L 63/20 |
| | | | 726/1 |
| 2013/0097303 A1* | 4/2013 | Gichana | H04L 63/0861 |
| | | | 709/224 |
| 2013/0111408 A1* | 5/2013 | Berus | H04L 63/083 |
| | | | 715/835 |
| 2013/0151685 A1* | 6/2013 | Bursell | G06F 9/455 |
| | | | 709/223 |
| 2014/0086038 A1* | 3/2014 | Jonkman | H04L 49/40 |
| | | | 370/201 |
| 2016/0043996 A1* | 2/2016 | Syed Mohamed | |
| | | | H04L 63/0485 |
| | | | 726/1 |
| 2016/0134605 A1* | 5/2016 | Cregg | H04W 4/08 |
| | | | 380/278 |
| 2016/0134632 A1* | 5/2016 | Cregg | H04B 10/85 |
| | | | 398/40 |
| 2017/0118041 A1* | 4/2017 | Bhattacharya | H04L 41/5054 |
| 2018/0167419 A1* | 6/2018 | Li | H04L 12/4633 |
| 2019/0011904 A1* | 1/2019 | Wyman | H04L 63/1441 |
| 2019/0124055 A1* | 4/2019 | Guo | H04W 12/10 |
| 2019/0215308 A1* | 7/2019 | Feyzibehnagh | H04L 63/0428 |
| 2019/0296852 A1 | 9/2019 | Lazzaro et al. | |
| 2021/0029080 A1* | 1/2021 | Shribman | H04L 61/2592 |

\* cited by examiner

US 11,032,102 B2

BRIDGE BETWEEN COMMUNICATION NETWORKS

GOVERNMENT INTEREST

The innovation described herein may be manufactured, used, imported, sold, and licensed by or for the Government of the United States of America without the payment of any royalty thereon or therefor.

BACKGROUND

A communication network can allow different devices to speak with one another. The communication network can employ security features such that non-network devices are prevented from communicating with network devices and such that network communications are protected. While this can increase network safety, it can be problematic when it is desirable to communicate with a non-network device.

SUMMARY

In one embodiment, a non-transitory computer-readable medium can be communicatively coupled to a processor and can be configured to store a command set executable by the processor to effectuate operation of a component set. The component set can comprise a first engagement component configured to engage with a first communication network. The component set can further comprise a second engagement component configured to engage with a second communication network. The component set can also comprise a bridge component configured to form a bridge between the first communication network and the second communication network. The first communication network and the second communication network can be incompatible absent the bridge and the bridge can effectuate communication between the first communication network and the second communication network such that the first communication network and the second communication network are compatible. The first engagement component, the second engagement component, the bridge component, or a combination thereof can implemented, at least in part, by way of non-software.

In another embodiment, a system can comprise a first engagement component configured to engage with a first communication network and a second engagement component configured to engage with a second communication network. The system can also comprise a bridge component configured to form a bridge between the first communication network and the second communication network. The system can additionally comprise a first impedance identification component configured to identify a first impedance of the first communication network and a second impedance identification component configured to identify a second impedance of the second communication network. The system can further comprise a first voltage identification component configured to identify a first voltage of the first communication network and a second voltage identification component configured to identify a second voltage of the second communication network. In addition, the system can comprise a first gain identification component configured to identify a first gain of the first communication network and a second gain identification component configured to identify a second gain of the second communication network. The first gain and the second gain can indicate a gain mismatch and the bridge can compensate for the gain mismatch. The first voltage and the second voltage can indicate a voltage mismatch and the bridge can compensate for the voltage mismatch. The first impedance and the second impedance indicate an impedance mismatch and the bridge can compensate for the impedance mismatch. The first network and the second network can be incompatible absent the bridge and the bridge can effectuate communication between the first network and the second network such that the first network and the second network are compatible.

In yet another embodiment, a system can comprise a first engagement component configured to engage with a first communication network and a second engagement component configured to engage with a second communication network. The system can further comprise a bridge component configured to form a bridge between the first communication network and the second communication network. The system can also comprise an overcurrent identification component configured to identify that a current sent from the first communication network to the second communication network is above a current threshold and a current protection component configured to prevent the current that is above the current threshold from reaching the second communication network. The system can additionally comprise an overvoltage identification component configured to identify that a voltage sent from the first communication network to the second communication network is above a voltage threshold and a voltage protection component configured to prevent the voltage that is above the voltage threshold from reaching the second communication network. The first network and the second network can be incompatible absent the bridge and the bridge can effectuate communication between the first network and the second network such that the first network and the second network are compatible. The first engagement component, the second engagement component, the bridge component, the current protection component, the over voltage component, the voltage protection component, or a combination thereof can be implemented, at least in part, by way of non-software.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

Multiple figures can be collectively referred to as a single figure. For example, FIG. 1 illustrates three subfigures—FIG. 5A, FIG. 5B, FIG. 5C, FIG. 5D, and FIG. 5E. These can be collectively referred to as 'FIG. 5.'

DETAILED DESCRIPTION

Figure 1:
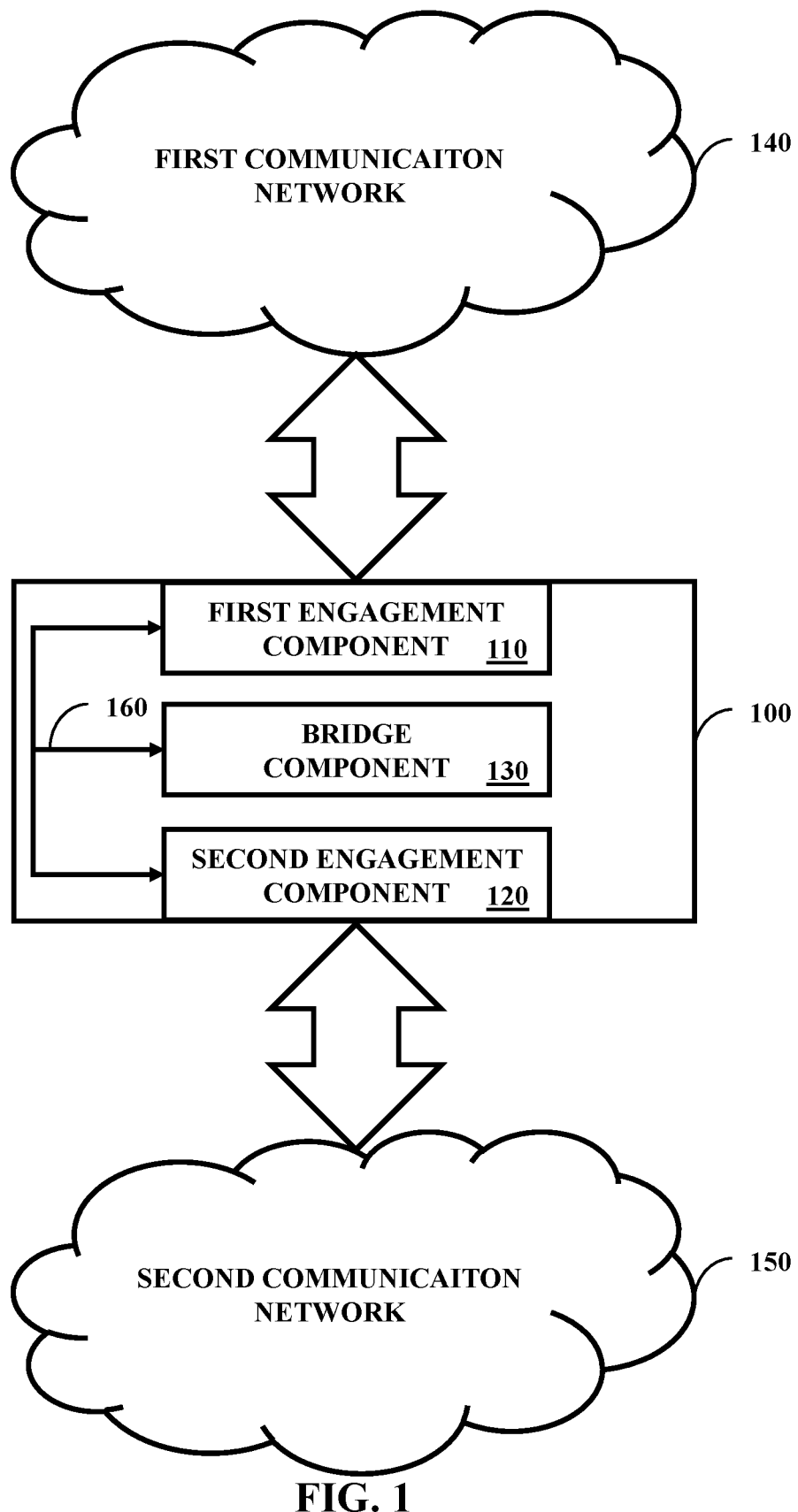
FIG. 1 illustrates one embodiment of a system comprising a first engagement component, a second engagement component, and a bridge component.

A situation can arise where it is desirable to have communication between two separate and distinct networks. However, these networks can have individual security features, such as encryption schemes, that make direct inter-communication difficult if not impossible. To facilitate this inter-network communication, a bridge can be created. This bridge can process communications from one network to another.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a system 100 comprising a first engagement component 110, a second engagement component 120, and a bridge component 130. The system 100 can operate in an environment with at least two networks, such as a first communication network 140 and a second communication network 150. The networks 140 and 150 can be separate and distinct networks with their own security and other features. This security can cause direct communication between the networks 140 and 150 to be difficult if not impossible. The system 100 can function to bridge the networks 140 and 150 so that communication between them is possible.

Consider the following example that will be used throughout the specification. The first communication network 140 can be for a first banking institution and the second communication network 150 can be for a second banking institution. The first network can have a first encryption scheme and the second network can have a second encryption scheme. These schemes help protect financial and proprietary information of the banking institutions such that the first network 140 and the second network 150 are incompatible. The banking institutions can desire to have communications between the two institutions while retaining security integrity. Therefore, the system 100 can be employed.

In one example, a unit of the first network 140 can be plugged into the first engagement component 110 to cause engagement of the first network 140 and the first engagement component 110 and a unit of the second network 150 can be plugged into the second engagement component 120 to cause engagement of the second engagement component 120 with the second network 150. When both units are plugged in, the bridge component 130 can form a bridge 160 between the first communication network 140 and the second communication network 150 to effectuate communication so that he networks 140 and 150 are compatible.

A communication destined for the second network 150 can originate from the first network 140 and pass to the unit of the first network. The unit of the first network can decrypt the communication, previously encrypted in accordance with the first encryption scheme, and then the communication is passed to the system 100 by way of the first engagement component 110. The communication can travel along the bridge 160 to the second engagement component 120 where the second engagement component 120 passes the communication to the unit of the second network. The unit of the second network can encrypt the communication in accordance with the second encryption scheme and the encrypted communication can move along the second network 150. Example communications can include routing number, account number, and other banking or non-banking information.

While aspects disclosed herein have been discussed with regard to banking, it is to be appreciated that this is just an example. As another example, the first communication network 140 can be a network for a military force of a first nation and the second communication network 150 can be a network for a military force of a second nation. A joint operation can occur where two nations militaries want to work together, yet not have their network security compromised by comingling networks. Therefore, the bridge 160 can be employed. In another example, the first communication network 140 can be of a National Guard network and the second communication network 150 can be of a state or municipality network 150 that work together through use of the bridge 160 in response to a natural disaster, such as an earthquake or forest fire.

In one example implementation, the system 100 can engage with the two networks 140 and 150. The first engagement component 110 can be hardwired to a radio of the first network 140 and the second engagement component 120 can be hardwired to a radio of the second network 150. A communication can travel to the radio of the first network 140, be decrypted and then sent to the system 100 by way of the first engagement component. The communication can be sent to the radio of the second network 150 by way of the second engagement component 120 and the bridge 160. The radio of the second network can encrypt the communication and send it along the second network 150.

For other examples in which aspects disclosed herein can be practiced, the communication networks can be for different civic departments (e.g., fire departments of different towns), a mix of government leveled organization (e.g., a state National Guard working with local police forces during a natural disaster evacuation), or a mix between private and public organizations (e.g., a construction contractor working with a local municipality of a public works project). Examples disclosed herein are to provide context and should in no way be used to limit interpretation of the claims.

Figure 2:
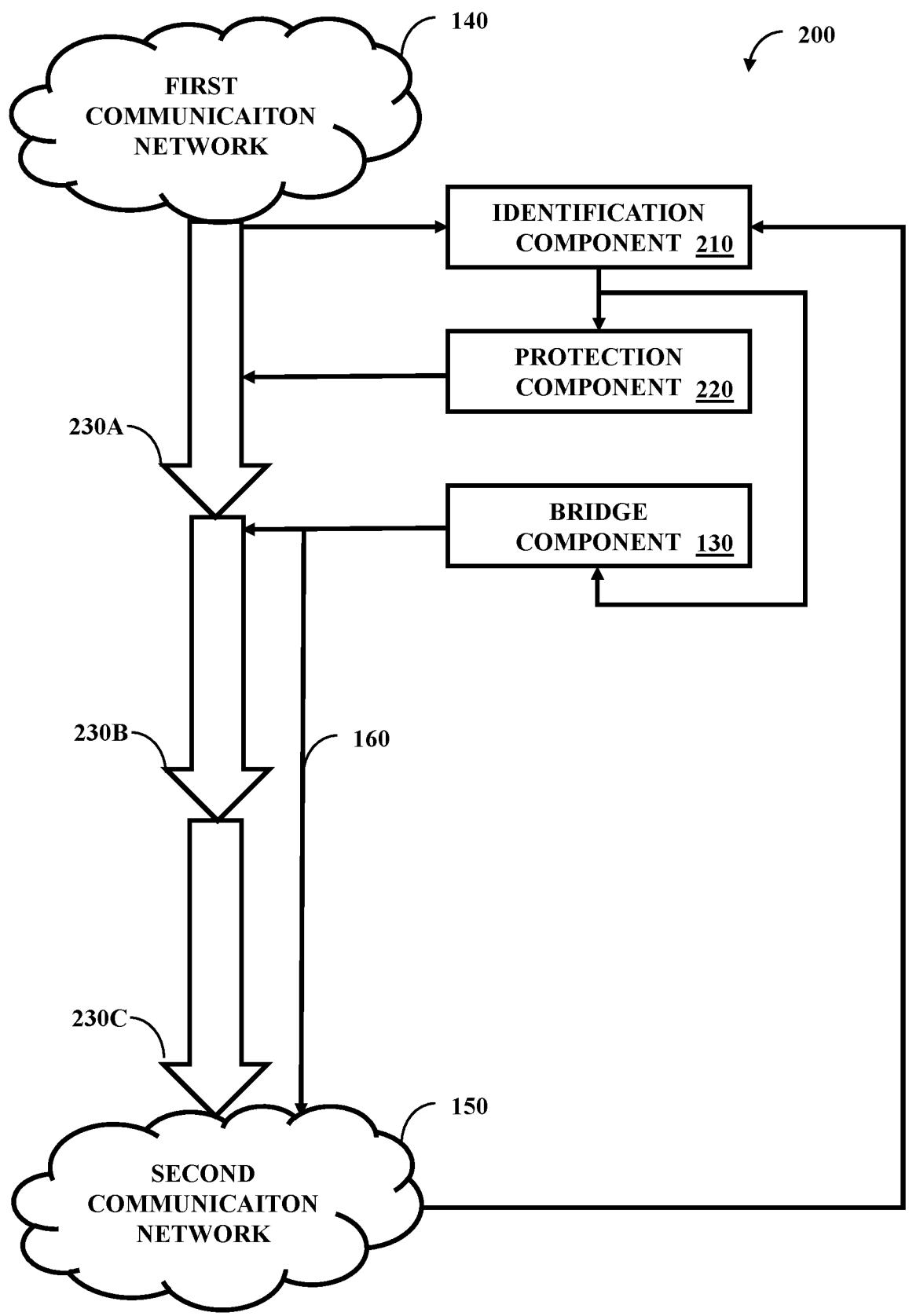
FIG. 2 illustrates one embodiment of an environment comprising an identification component, a protection component, and the bridge component.

FIG. 2 illustrates one embodiment of an environment 200 comprising an identification component 210, a protection component 220, and the bridge component 130. In one embodiment, the identification component 210 and the protection component 220 can be implemented as part of the bridge component 130. A communication 230 can be sent from the first network 140 to the second network 150; the communication 230 from the first network 140 can have three phases—an enter phase 230A (a phase when entering the system 100 of FIG. 1 at the first engagement component 110 of FIG. 1), a transition phase 230B (a transitional phase converting the communication 230 from a format of the first network 140 to a format of the second network 150), and an exit phase (a phase when leaving the system 100 of FIG. 1 for travel upon the second network 150 at the second engagement component 120 of FIG. 1).

The identification component 210 can make various identifications about the first network 140 (e.g., by way of the first communication 230A or an initial assessment when the first network 140 engages with the first engagement component 110 of FIG. 1) and the second network 150. The bridge component 130 can use these identifications in formation of the bridge 160. In one example, the identification component 210 identifies an impedance of the first network 140 and an impedance of the second network 150. The bridge component 130 can determine if there is an impedance mismatch with these impedances and if so, then the bridge 160 can be formed to compensate for the impedance mismatch.

As with the impedance mismatch, the same can be done for a gain mismatch or a voltage mismatch. The identification component 210 can identify a voltage and gain (e.g., volume) of the first network 140 and the second network 150. The bridge component 130 can determine if there is a gain mismatch and/or voltage mismatch and if so, then form the bridge 160 so as to compensate for the gain and/or voltage mismatch.

The bridge component 130 can employ the protection component 220 to protect the second network 150 from the first network 140 as well as protecting itself and/or the system 100 of FIG. 1. Two example scenarios that can merit protection by the protection component 220 is too high of a voltage (e.g., voltage spike or surge) or too high of a current. The identification component 210 can identify a current and a voltage sent from the first network 140 as well as compare the current against a current threshold and the voltage against a voltage threshold. If the voltage or current are too high, then the protection component 220 can stop the communication 230 from reaching the second network 150 and/or certain hardware of the bridge component 130. In one example, the identification component 210 and the protection component 220 can implement as a fuse for current/overcurrent and a diode or clamp for voltage/overvoltage.

Figure 3:
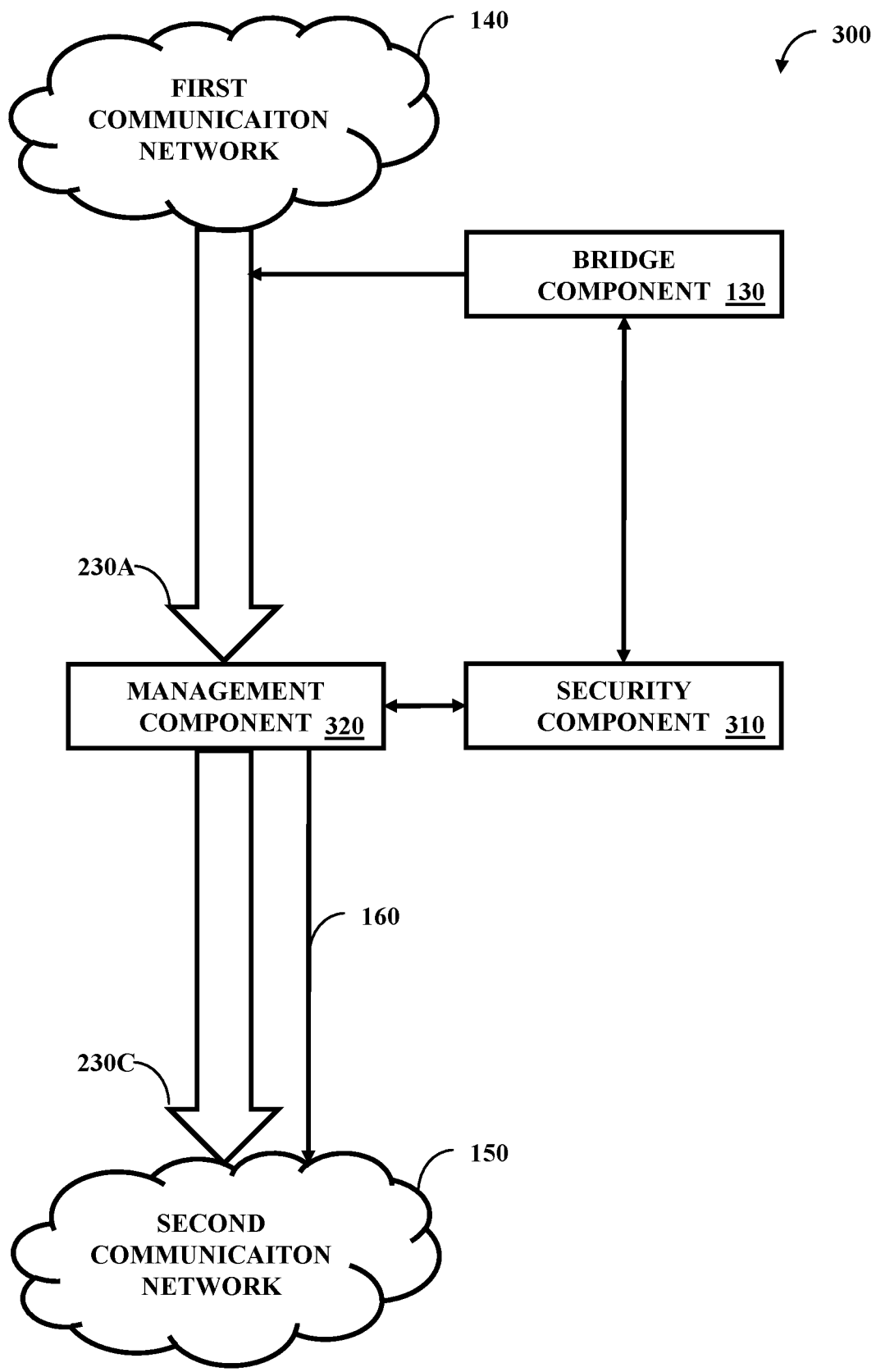
FIG. 3 illustrates one embodiment of an environment comprising a security component, a management component, and the bridge component.

FIG. 3 illustrates one embodiment of an environment 300 comprising a security component 310, a management component 320, and the bridge component 130. In one embodiment, the security component 310 and the management component 320 implement as part of the bridge component 130. Adversaries, including the operators of the networks 140 and 150 as well as unrelated parties, can attempt to compromise the security of the bridge component 130. The security component 310 can determine if the security of the bridge component 130 is comprised. If the security is compromised, then the management component 320 can perform management tasks related to the compromising (e.g., prevent or allow conversion of the communication 230A into 230C).

In one embodiment, the security component 310 can function as a check component configured to perform a software security check on software associated with the bridge component 130, such as software used to create the bridge 160. The management component 320 can function as a break component configured to break the bridge 160 in response to a failure indication from the software security check. Returning to the banking information, since financial information can be considered extremely sensitive, any compromise can result in the bridge 160 being broken (e.g., the bridge 160 being destroyed or the bridge 160 being, at least temporarily, designated as not usable or untrusted).

In one embodiment, the security component 310 functions as a content analysis component configured to perform a content analysis of the communication 230A from the first network 140 to the second network 150 to produce a content analysis result. The management component 320 can function as a decision component configured to make a determination if the communication 230 should transfer to the second network 150 based, at least in part, on the content analysis result. The management component 320 can also function as a block component configured to prevent the communication 230 from reaching the second network 150 when the determination is that the communication 230 should not transfer to the second network 150. The management component 320 can also perform conversion of the communication 230 (e.g., 230A to 230B and then 230B to 230C) when the determination is that the communication should transfer. With the banking example, there can be an understanding between two financial institutions that social security numbers are not to be transferred. The security component 310 can scan the communication 230 and determine if a social security number is present—if so, then the communication 230 can be blocked.

In one embodiment, instead of blocking, filtering of the communication 230A can occur. The security component 310 can function as an assessment component configured to assess a content of the 230A to produce an assessment result. The management component 320 can function as a filter component configured to perform a filter of the content based, at least in part, on the assessment result. The filtered content can transfer to the second network 150 as the communication 230C. Returning to the social security number example, the management component 320 can remove the social security number before sending the communication 230 to the second network 150.

Core information of the communication 230 can be analyzed, but so can metadata of the communication 230 (e.g., timestamps) and other factors. The security component 310 can function as a pitch evaluation component configured to perform a pitch evaluation of the communication 230 to produce a pitch evaluation result. The management component 320 can function as a decision component configured to make a determination if the communication 230 should transfer to the second network 150 based, at least in part, on the pitch evaluation result and function as a block component configured to prevent the communication 230 from reaching the second network 150 when the determination is that the communication 230 should not transfer to the second network 150. In a banking example, the communication 230 can be a voice communication of a teller reading information. Voice communications can have a standard pitch (e.g., standard volume, standard cadence, etc.) and a deviation from this can be a sign of a bad actor since someone not used to communicating this information can communicate the information in a non-standard manner.

Along with communication evaluating, the security component 310 can perform security with regard to hardware pertaining to the bridge component 130. The security component 310 can be configured to monitor the first engagement component 110 of FIG. 1, the second engagement component 120 of FIG. 1, and the bridge component 130 to produce a monitor result. The security component 310 can also be configured to scrutinize the monitor result such that a determination is made on if a security violation occurs. The management component can be configured to, at least in part, block the communication 230 when the determination is that a security violation occurs.

In one example, the security component 310 can detect if someone is trying to access the system 100 of FIG. 1 (e.g., plugging a wrong plug type into the first engagement component 110 or trying to open a housing containing the bridge component 130). Depending on the type of violation, the communication 230A can be blocked, altered, or transferred as normal (e.g., with a return notification to the network of the security concern). Sometimes, information is so critical and time-sensitive that even with a security violation, the communication 230 should transfer, such as requirements for money to be transferred by a deadline. The management component 320 can balance information importance against the gravity of the security violation to determine if transfer of the communication 230 should occur and if any alteration is appropriate.

In one embodiment, the bridge component 130, security component 310, and management component 320 can be retained in a housing with an interface (e.g., graphical user interface). The security component 310 can function as a lock component configured to lock the bridge component 130 from operation. The management component 320 can comprise an interface and can determine a valid unlock instruction (e.g., swipe motion or pin number) for the bridge component 130. In response to reception of the valid unlock instruction, the security component 310 can unlock the bridge component 130 and the bridge component can then form the bridge 160

Figure 4:
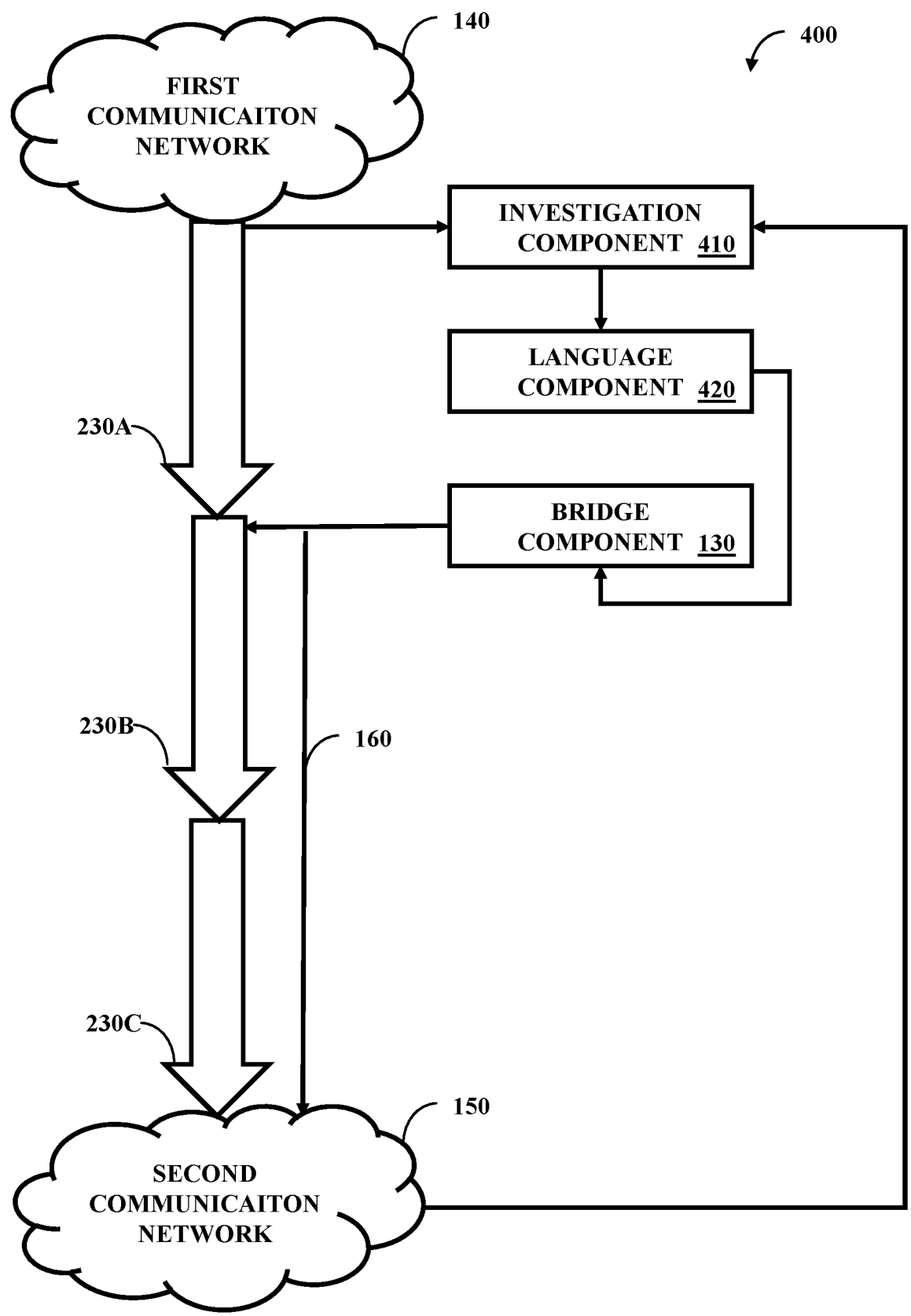
FIG. 4 illustrates one embodiment of an environment comprising an investigation component, a language component, and the bridge component.

FIG. 4 illustrates one embodiment of an environment 400 comprising an investigation component 410, a language component 420, and the bridge component 130. In one embodiment, the investigation component 410 and the language component 420 implement as part of the bridge component 130. Returning to the banking example, the first network 140 can be a United States bank network with communications in English (e.g., American English) and the second network 150 can be a Canadian bank network based in Quebec with communications in French (e.g., Canadian French). The bridge 160 can be used to manage the language difference between the first network 140 and the second network 150. As an example, the communication 230 can be a speech communication, and the bridge can translate the speech in English to English text, convert the English text to French text, and then convert the French text to French speech.

In one embodiment, the investigation component 410 can function as an assignment component configured to assign a send language to the communication 230 from the first network 140 to the second network 150 and can function as a determination component configured to determine if the send language matches a receive language of the second network 150. The language component 420 can function as a conversion component configured to convert the communication 230 from the send language to the received language if the determination is that they do not match and can function as a transfer component configured to cause the converted communication 230 to transfer to the second network 150 when the determination is that they do not match and configured to cause the communication 230 to transfer to the second network 150 absent conversion when the determination is that they do match. What is defined as a match or not can be customizable. In one example, a non-match can be hard or soft. An example of a hard non-match can be that American English and British English are not matching and 'color' can be converted to 'colour.' With a soft non-match, American English and British English can be considered to match one another.

Different implementations can be employed with regard to language identification. In one embodiment, the investigation component 410 is configured to perform a language analysis on the communication 230 to produce an analysis result. The language component 420 can assign the send language to the communication 230 based, at least in part, on the analysis result. Independent of or in addition to language analysis, other features can be practiced to assign the send language.

In one embodiment, the language component 420 can function as a global position component configured to identify a global position that pertains to the bridge component 130, such as a global position of a housing that retains the bridge component 130. The investigation component 410 can assign the send language based, at least in part, on the global position. Returning to the United States-Canada banking example, if the housing is located in Quebec, then the investigation component 410 and language component 420 can draw an inference that incoming communications are French. The communication 230A can be analyzed to confirm this inference, such as with lower analysis scrutiny than absent the global position inference.

In one embodiment, the investigation component uses profiles for the networks 140 and 150 with regard to the communication 230. The investigation component 410 can function as a profile component configured to determine a profile associated with the first network 140 and/or the second network 150. In one example, a user can select a profile (e.g., English profile or French profile) by way of a touch display that is also used to unlock a housing that retains the bridge component 130. The language component 420 can function as a data component configured to access a data set that corresponds to the profile and the bridge component 130 can employ the data set information of the bridge 130.

In one example, the bridge component 130 can create multiple bridges. In this example, there can be a third communication network and the three networks can have three distinct languages, such as English, French, and Spanish. Individual bridges can be created (e.g., first to second, second to third, and first to third) or an omni-bridge can be created and the bridge component can direct traffic. When a new network enters a housing retaining the bridge component 130, such as a fourth network engaging a fourth engagement component (with the third network engaging a third engagement component), a profile can be accessed for that fourth network (e.g., from direct instruction or through analysis).

If the bridge component 130 has not previously engaged with the fourth network or no record was properly kept, the investigation component 410 and the language component 420 can determine the language of the fourth network. Additionally, the language component 420 can create a new profile. As an example of this, the language component 420 can determine that a profile is not available for the fourth network, evaluate the bridge to produce a bridge evaluation result, create a profile for the fourth network based, at least in part, on the bridge evaluation result, and cause the profile to be stored (e.g., stored locally or stored remotely so it can be accessed by another bridge component 130).

Figure 5A:
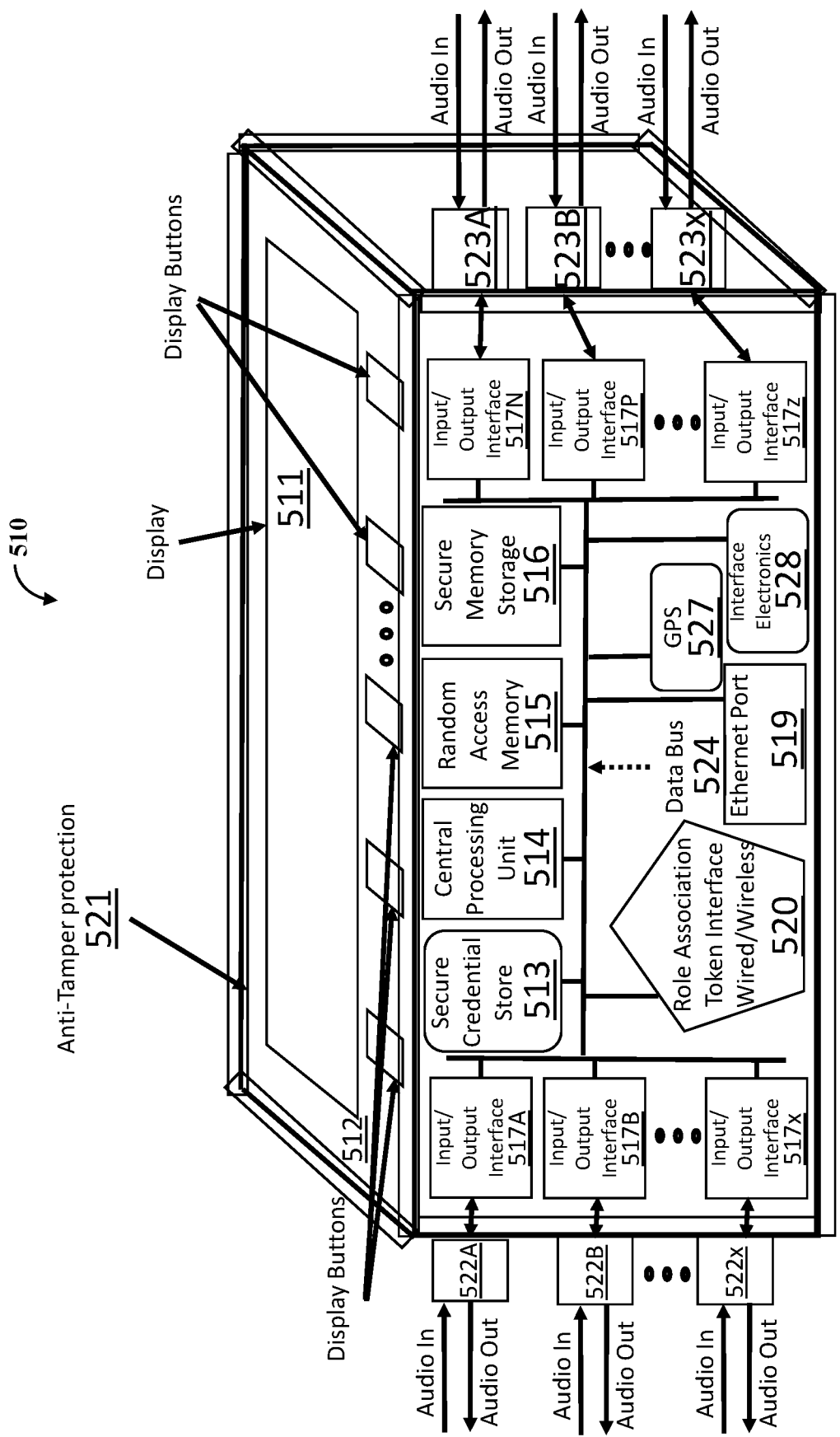
FIG. 5A illustrates one embodiment of a Universal Secure Radio Gateway.
Figure 5B:
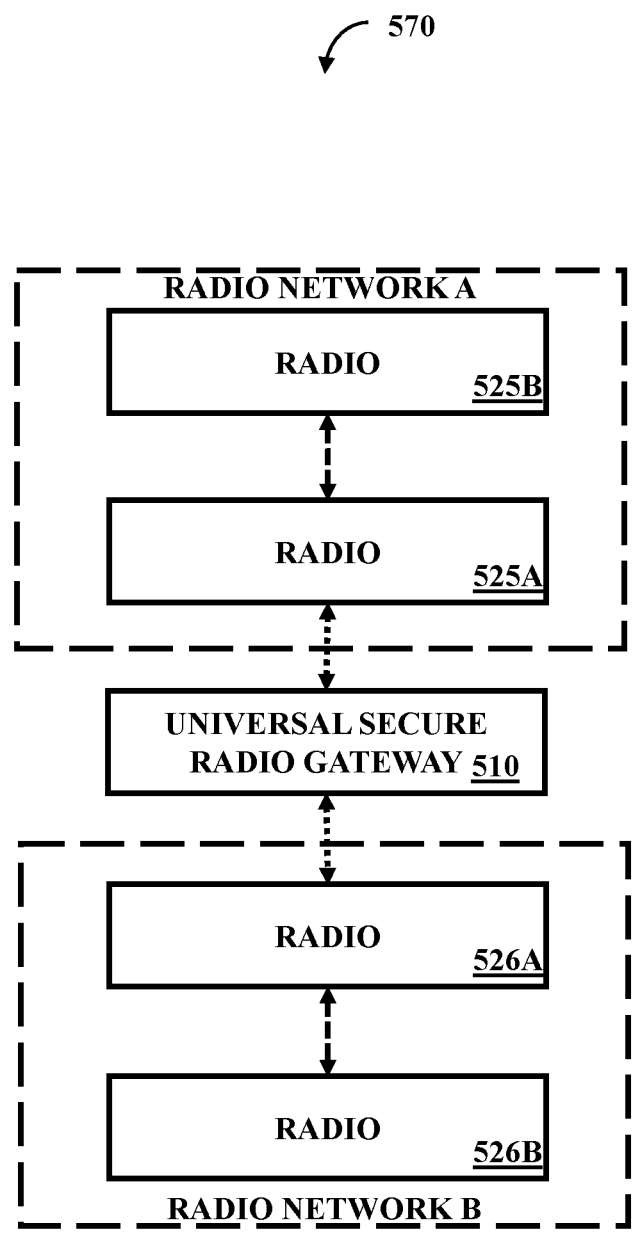
FIG. 5B illustrates one embodiment of the Universal Secure Radio Gateway bridging two radio networks.
Figure 5C:
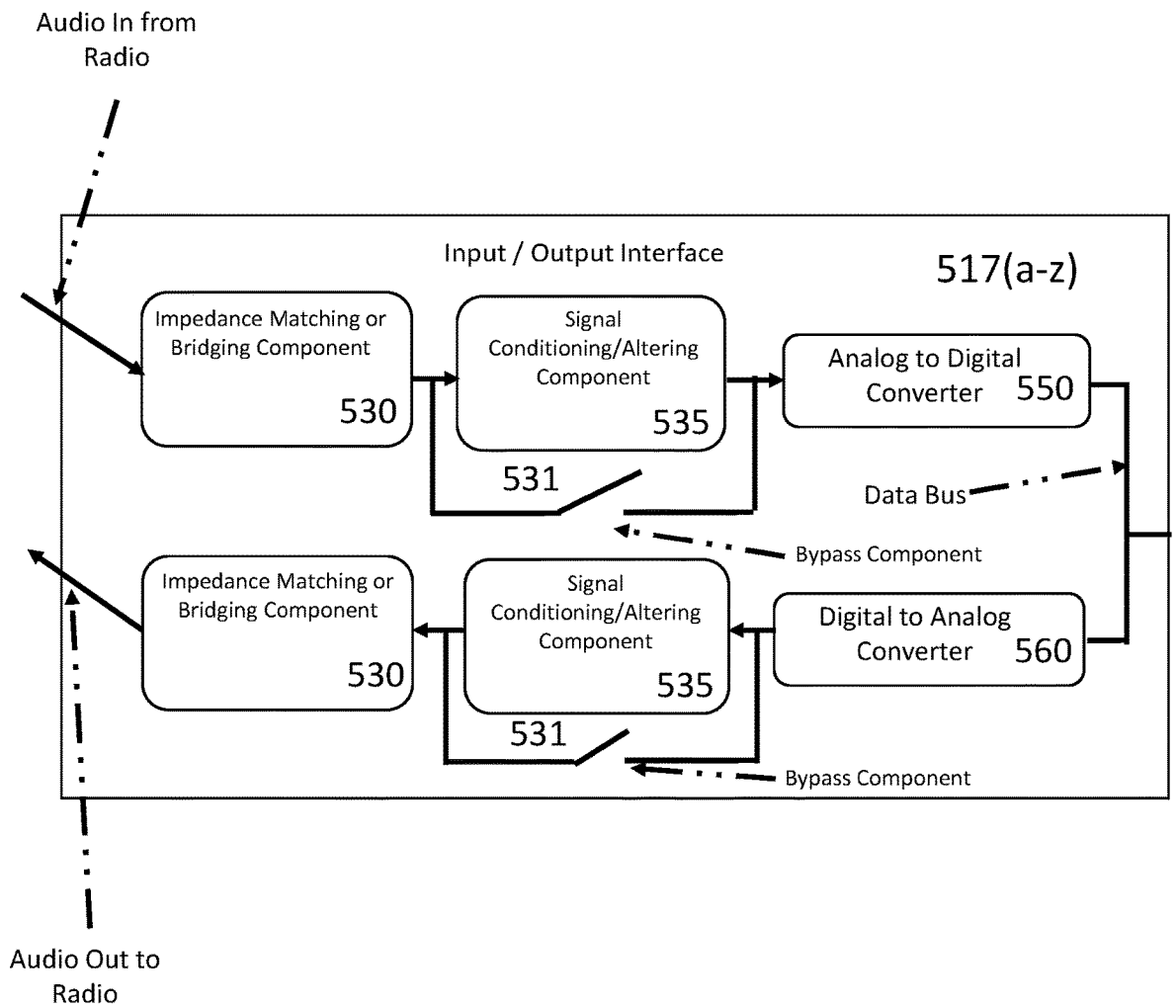
FIG. 5C illustrates one embodiment of an interface.
Figure 5D:
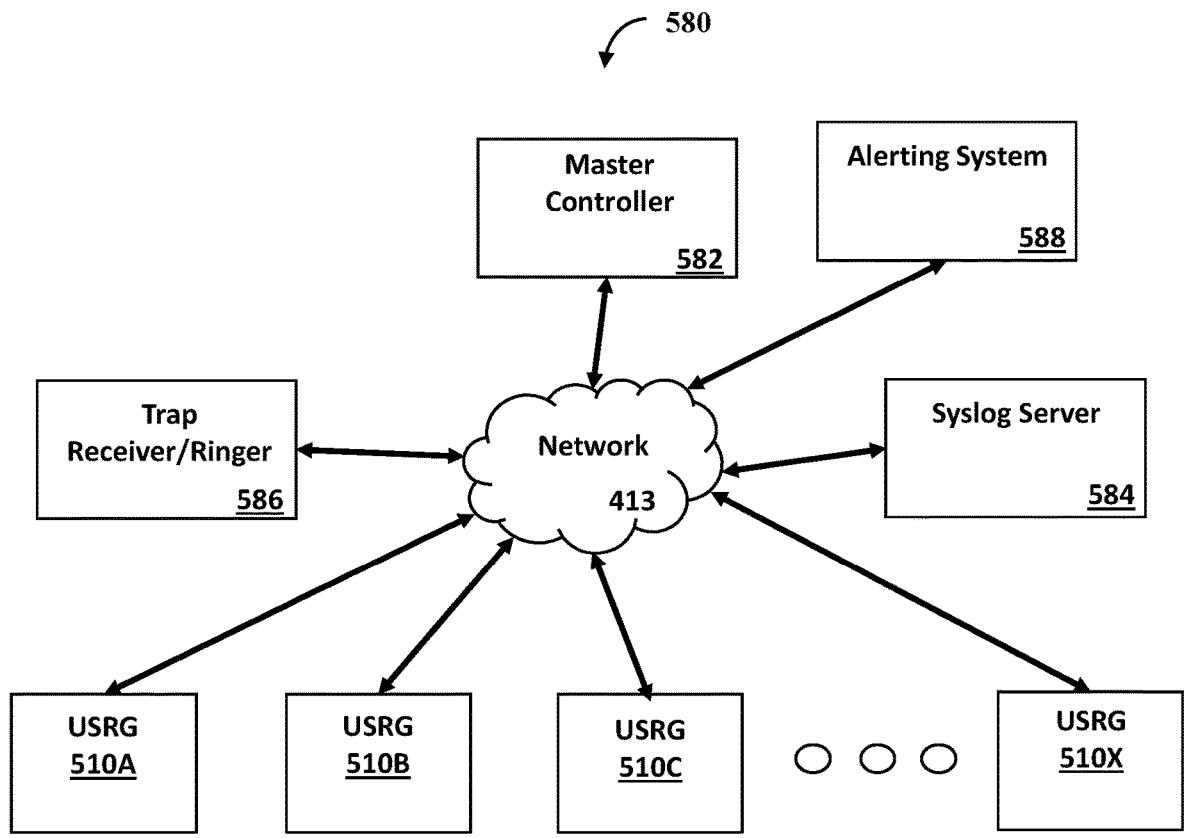
FIG. 5D illustrates one embodiment of an environment.
Figure 5E:
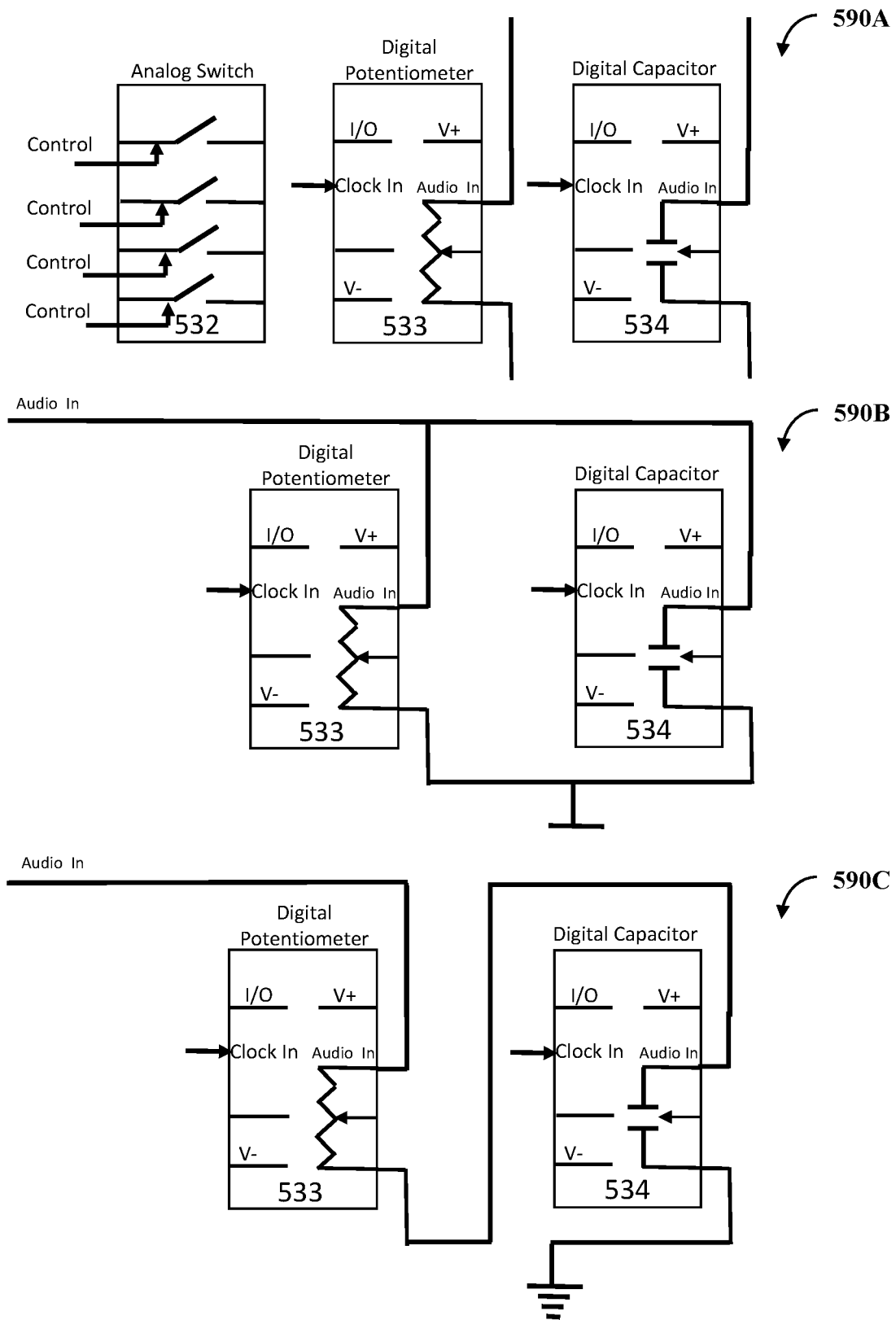
FIG. 5E illustrates three embodiments of circuitry.

FIG. 5A illustrates one embodiment of a Universal Secure Radio Gateway (USRG) 510, FIG. 5B illustrates one embodiment of the USRG 510 in a radio environment 570, FIG. 5C illustrates one embodiment of an interface 517 (e.g., 517a), FIG. 5D illustrates one embodiment of an environment 580, and FIG. 5E illustrates three embodiments of circuitry 590A-C. USRG 510 can function as the system 100 of FIG. 1 and be made up of different components. Example components can include a display 511, display buttons 512, a Secure Credential Store (SCS) 513, a Central Processing Unit (CPU) 514, a Random Access Memory (RAM) 515, a secure memory storage 516, Input/Output (I/O) interfaces 517a-z, an Ethernet port 519, a Role Association Token (RAT) interface 520, anti-tamper protection 521, radio interfaces 522a-x and 523a-x, a data bus 524, a Global Positioning System (GPS) 527, and interface electronics 528. At least some of the components listed can implement as at least part of other components discussed herein. In one example, the interface 517a can be part of the first engagement component 110 of FIG. 1.

Returning to the list of components of FIG. 5, the display 511 provides visual feedback to users of all levels facilitating the ability to perform administration, verify status of current operating mode, and may be used as a manner of additional authentication. The authentication methods can include the ability to perform a finger swipe pattern match, entry of a Personal Identification Number (PIN), entry of a passphrase, or a combination thereof. The display 511 can be a standard display which works in concert with physical display buttons 512 or may be a display with capability such as used with a modern smartphone or tablet. For authentication purposes, the display 511 can allow a virtual keyboard to be displayed for use by an administrator, maintainer, or user to enter a PIN or passphrase to provide the appropriate level of access based on the person's role. The virtual keyboard may also have the capability of being randomized such that the characters displayed on the keyboard are not in the same location as that of a standard QWERTY keyboard. This randomization function can occur randomly, on each login attempt, never, or some combination thereof. This feature aids in guarding against capturing the PIN or passphrase due to investigation of wear or material deposits on the screen. It also aids against shoulder surfing attacks in which others look over the shoulder of the person entering the PIN or passphrase and attempting to remember the PIN or passphrase based upon the location of the memorized button presses. Display buttons 512 can also be used as part of the authentication sequence to increase the level of entropy to the PIN or passphrase pattern by forcing a user to be physically present to log into the USRG 510. For networked systems for which only status data is desired to be transmitted, this will ensure an undesirable entity attempting to access the device cannot gain access to perform a malicious act such as capturing the unencrypted audio or data stream and replaying audio or a data stream that may provide false or detrimental information leading to mission compromise or failure. An additional protection can be provided by RAT 520. For example, RAT 520 can be comprised of but not limited to a physical interface such as a Universal Serial Bus and/or a wireless interface such as a Near Field Communications interface to provide a means of connectivity to facilitate authentication required to perform service affecting functions such as but not limited to administration or maintenance. Once the RAT 520 is engaged, and after proper login credentials are presented, administration or maintenance level tasks, based on the appropriate role, can be performed. SCS 513 holds the credential which when associated with the credential presented via RAT interface 520, unlocks the capability of the administrator or maintainer role. A user token can also be employed to act as a method enabling the functionality of the USRG 510. It can be appropriate to control usage of the USRG 510 such that it is inoperable unless a RAT 520 is presented. This would be useful to guard against the ability to inject malware within the system code.

After the user successfully logs in prior to making changes, the user can select the language to be input to the USRG 510 on a particular audio interface and the desired language for which the received audio is to be translated to and associate this selection with the desired audio interface to which the translated audio is to be output. For example, radio network A (e.g., the first communication network 140 of FIG. 1) connects a radio used for retransmission purposes to radio interface 522A, and desires to receive their radio transmissions in language A (e.g., English). Radio network B (e.g., the second communication network 150 of FIG. 1) connects a radio used for retransmission purposes to radio interface 522B, and desires to receive their radio transmission in language B (e.g., Korean). The user selects language A from a list of available languages for translation and associates the translation of the audio received on an audio interface other than audio interface 522A, which in this case is audio interface 522B, to be translated to language A prior to being output to audio interface 522A. The method of selecting a language and associating it with a particular interface can be done by selecting the desired language with the desired interface via selecting the language from a list viewed on display 511 and using display buttons 512 to set the desired selections. An additional manner of performing this is to utilize the swipe capability of display 511 and selecting the desired language and dragging it to the desired interface via display 511. A means of locking screen 511 can be implemented to guard against accidental changes to profile/interface associations. The user selects language B from a list of available languages for translation and associates the translation of the audio received on an audio interface other than audio interface 522B, which in this case is audio interface 522A, to be translated to language B prior to being output to audio interface 522B. A more detailed description is that as audio is received on the audio in line of audio interface 522B, it is sent to I/O interface 517B where it is digitized and output to data bus 524. Once the digitized data is output to data bus 524, it is sent to be processed by a speech translation algorithm utilizing resources within the USRG 510 including Secure Memory Storage 516, Random Access Memory 515, and Central Processing Unit 514. The speech translation algorithm then translates the audio received on audio interface 522B to language A. It then sends the translated audio via data bus 524 to the audio out port on audio interface 522A. The reverse occurs when audio is received on the audio in line of audio interface 522A. In the case where radios are connected to greater than 2 audio interfaces and language translation selections are different for each audio interface, the USRG 510 can perform the translation of the received audio into the language selected to be output to the particular audio interface. In one example, 4 radios are connected to the USRG 510 and a different language has been selected for each audio interface. As audio is received, it is digitized, translated into the other 3 languages, and output to the appropriate audio interface to be input to the desired radio. The received and translated audio information can be stored within the USRG 510, yet may or may not be stored. In the case where data is not desired to be stored, the USRG 510 directly after receiving and translating the audio data deletes data such that if the USRG 510 were compromised or captured, no residual data is available for exploitation.

The USRG 510 can, on one example, be implemented in a scenario to facilitate communications between 2 different radio nets. Radio Net A (e.g., the first communication network 140 of FIG. 1) can comprise Radio 525B which is not physically connected to USRG 510 and Radio 525A which is connected to an audio interface of USRG 510. Radio 525A can be connected to any available audio interface of USRG 510. For this description, Radio 525A will be connected to audio interface 522A of USRG 510. Radio Net B (e.g., the second communication network 150 of FIG. 1) can comprise Radio 526B which is not connected to USRG 510 and Radio 526A which is connected to an audio interface of USRG 510. Radio 526A can be connected to any available audio interface of USRG 510. For this description, Radio 526A will be connected to audio interface 523A of USRG 510.

The USRG 510 can have various functionality. In one example, the USRG 510 can have the ability to recognize the language from the audio received at a specific port, and through analysis performed by internal algorithms, select the detected language as the language to translate audio to be output to that port. Location information from GPS 527 can be used by the recognition algorithm to infer an increased likelihood of a desired language based upon the location data. This can be used to increase the accuracy of the speech recognition algorithm by applying a weight to the algorithm implying the likelihood of detecting one language versus another being more likely due to the physical location of the USRG 510. Radio 525B can be configured to not be collocated with radio 525A nor is it collocated with USRG 510. Radio 525A's audio port can be connected to audio interface 522A of USRG 510. USRG 510 can detect the connection of radio 525A to audio interface 522A. Once the connection is detected, USRG 510 can present a message, such as by way of the display 511, asking the operator to begin data acquisition to perform the automatic language detection. The operator can invoke the automatic language detection algorithm. I/O interface 517 of FIG. 5C can comprise at least one of an impedance matching or bridging component 530, signal conditioning/altering component 535, an analog to digital (A/D) converter 550, and a digital to analog (D/A) converter 560. This can be for all I/O Interfaces 517(a-z) of the USRG 510. Upon invocation of the automatic language detection function, the signal conditioning/altering component 535 can be disabled and bypassed by way of the bypass component 531 for the inbound and outbound connections. This can be achieved through the use of an electronic component such as a relay or analog switch which alters the signal path such that the signal is connected to signal conditioning/altering component 535 or in the case where the speech is to be sampled and analyzed by the speech recognition algorithm, it bypasses the signal conditioning/altering component 535 and connects directly from impedance matching or bridging component 530 to A/D converter 550. This can be done to minimize the distortion in the received audio used for determining the language and maximize the algorithms accuracy to which the audio output to audio interface 522A is to be translated to.

Once the bypassing of signal conditioning/altering component 535 is disabled and bypassed, audio interface 522A of USRG 510 keys the push to talk (PTT) line which keys the transmitter of radio 525A. USRG 510 can be configured to not send audio for a short time period to ensure radio 525A's PTT line is properly keyed. After the desired time delay, USRG 510 sends audio out audio port 522A to the audio interface of radio 525A. The audio is transmitted through radio 525A to radio 525B. The modulated transmission is received at radio 525B. The transmission can be demodulated by radio 525B and the audio is heard by the user via a headset or handset connected to radio 525B. Instructions can be included in the transmission directing the user listening to the audio received at Radio 525B to speak a selected set of words. The user at Radio 525B can be directed to wait until the end of the message is heard prior to engaging its push-to-talk. Once the transmission ends, Radio 525B's user speaks the requested set of words in the language in which they desire to receive their audio. The audio is then transmitted to radio 525A. Upon reception at radio 525A, the transmission is demodulated and the audio is sent out of radio 525A and into audio interface 522A. The audio received at audio interface 522A is sent from audio interface 522A into I/O Interface 517A.

Once within the I/O interface 517A, the audio enters the impedance matching or bridging component 530. The signal travels through the impedance matching or bridging component 530 and travels along bypass component 531 into the A/D Converter 550. Once converted to digital data, the data is output from the A/D Converter 550 to data bus 524 where it is then sent to CPU 514 where the analysis algorithm is employed within the data elements of USRG 510. These components can include but are not limited to CPU 514, RAM 515, and Secure Memory Storage 516. The analysis algorithm processes the audio and determines which language has been spoken. Once the algorithm converges upon a match (e.g., the best match), the algorithm selects the language to which all audio received within USRG 510 at any audio interface port other than Audio Interface 522A, is to be translated to and sent out of Audio Interface 522A to Radio 525A which will modulate the received audio and transmit it to Radio 525B. If no response is received within a preprogrammed timeframe, the message may be resent in the same language or a different language. The decision as to the next language to attempt to perform the data collection may be preprogrammed or the decision may be determined via an algorithm utilizing location information provided by GPS 527. Once the algorithm decides upon the language for which the audio received on USRG 510's Audio Interfaces other than Audio Interface 522A, the USRG sends an audio message via Radio 525A to Radio 525B to confirm the language to be translated to. Upon confirmation, USRG 510 stores the language selection in Secure Memory Storage 516 and sets Audio Interface 522A to receive audio sent to it to be translated in the detected and confirmed language. The setting of USRG 500's Audio Interface to have audio output to it translated in a particular language may or not be persistent across power cycles of USRG 510. Persistence across power cycles can be at the discretion of the developer.

While illustrated as a separate housing, the features of the USRG 510 can be implemented in different manners. In one example, with FIG. 5B, implementation can occur without a distinct USRG 510, with features in modular form in radios 525A and 525B. As an example when at least part of the USRG 510 functions as the system 100 of FIG. 1, the first engagement component 110 of FIG. 1, the second engagement component 120 of FIG. 1, and the bridge component 130 of FIG. 1 can be implemented upon a communication device of the first network 140 of FIG. 1 (e.g., implement partially on the radio 525A and partially on the radio 526A) and/or a communication device of the second network 150 of FIG. 1. In this, the two radios 525A and 526A can connect together to have the bridge 160 of FIG. 1 without extra hardware of the USRG 510.

Diagram 300 represents I/O Interface 117(*a-z*). I/O Interface 117(*a-z*) will be referred to as I/O Interface 117 for brevity. I/O Interface 117 is, in one embodiment, a component comprising of two Impedance Matching or Bridging Components 130, two Bypass Components 131, two Signal Conditioning/Altering Components 135, an Analog to Digital (A/D) converter 150, and a Digital to Analog (D/A) converter 160. These aforementioned components are connected in a serial fashion where the audio being output from the radio is input to Impedance Matching or Bridging Component 130. After being output from Impedance Matching or Bridging Component 130, the signal is input to Signal Conditioning/Altering component 135 where the signal is altered from its original waveform. After being altered by Signal Conditioning/Altering Component 135, the signal enters A/D converter 150 where the signal is converted from an analog signal to a digital signal. Once the digitization process of the audio is complete, the digitized audio is sent to Data Bus 124 where it will be sent to components within the USRG 510 to be translated and sent to the appropriate audio interface and input to the desired radio. The process is reversed for audio as it exits I/O Interface 117 and exits to the destined radio. Bypass component 131 is utilized by the USRG 510 to bypass Signal Conditioning/Altering Component 135 under special cases such as described in the previous paragraph.

In one embodiment, multiple USRGs 510 can be controlled by a master controller 582. An amalgamation of USRGs 510A-X (stated throughout this paragraph as USRG (s) 510 for brevity) where the master controller 582 acts as the main point of administration and control to a network of USRGs 510. The master controller 582 can accomplish administrative tasks such as obtaining health information about a particular or multiple USRGs 510, perform software upgrades and patches, provide or modify configuration data for a specific USRG 510, a USRG 510 group, or some other combination of USRGs 510. The master controller 582 can connect to USRG(s) 510 via a secure connection. The master controller 582 can communicate with USRG(s) 510 via an Internet Protocol (IP) connection or some other manner dependent upon the physical data interface connecting master controller 582 and USRG (s) 510 (e.g., RS-232). Credentials supporting a secure connection between the master controller 582 and USRG 510 can be stored within the secure credential store 113 within each individual USRG 510. USRG(s) 510 can be capable of being managed via a web based Graphical User Interface (GUI) accessed via the master controller 582 or by another manner such as by way of a Simple Network Management Protocol (SNMP). Additionally, during normal operation, USRGs 510 can be administered to send information about themselves such as but not limited to system health, languages they are capable of translating, port status, and location information. The USRG 510 can perform tamper detection and send a message to Syslog Server 584 informing that a tamper detection event has occurred. The information sent may contain but is not limited to the current system time, the time the tamper was detected, additional details regarding a particular interface where the tamper was detected, the current physical location of USRG 510, or other information isolating the area of tamper detect. In addition to sending this information to the syslog server 584, upon a tamper detection, an alert can be sent to the trap receiver/ringer 586. Upon reception of the alert, the trap receiver/ringer 586 can send a further notification via email, Short Message Service (SMS) message, or other message formats to a predefined destination to inform the appropriate party of the tamper detection. This can entail sending the alert to an alerting system 588 that can facilitate additional distribution of the received alert. After reception of the alert, the notified party can then take appropriate action to mitigate the threat or replace a faulty USRG 510.

Circuits 590A-C represent three examples of at least part of the impedance matching or bridging component 530. The impedance matching or bridging component 530 can be passive, active, or a combination there of electronic modules utilized to provide an improved (e.g., optimized) impedance match with the originating and destined source for audio signals. Diodes can be included to offer protection against over voltage conditions. Additional modules can be included to protect against over current conditions. Components can be connected in series (e.g., as in 590C), parallel (e.g., as in 590B), or a combination thereof. The impedance matching and bridging component 530 can comprise (e.g., as in 590A) an analog switch 532, a digital potentiometer 533, and a digital capacitor 534. In one example, the analog switch 532 can be implemented with mechanical relays, transistors, or manual switches.

The output of the impedance matching or bridging component 530 can be supplied to the signal conditioning/altering component 535. The signal conditioning/altering component 535 can be configured to alter the inbound and outbound signals entering and exiting USRG 510 ensuring the audio received into the USRG 510 is altered in a nondeterministic way to guard against a known plain text attack. An internal algorithm within the USRG 510 can alter the audio prior to being sent to the next radio from USRG 510.

The USRG 510 can provide universal facilitation of connectivity between disparate radios, waveforms, frequencies, and cryptographic algorithms. This can be done with software definable interface parameters, proactive (e.g., automatic) interface impedance matching and bridging, secure remote monitoring and configuration (e.g., automatic configuration based on location information), speech recognition and translation (e.g., automatic translation based on recognized language), centralized administration and control, role based access via the use of security tokens, or a combination thereof. The USRG 510 can also function as an indicator of potential physical threats to a location due to its ability to alert an entity of an attempt to or a successfully executed tampering of the USRG 510.

The USRG 510 can store connection profile information which when manually selected, configures an audio interface to be impedance matched or impedance bridged with the selected radio to ensure an appropriate audio signal level is input to the connected radio. Moreover, the USRG can ensure appropriate audio signal level input between radios (e.g., of different networks) by providing the ability to automatically impedance match or impedance bridge to the audio interface connections between individual radios and the USRG 510 and/or a non-associated network. The USRG 510 can also detect a newly connected device and automatically match the impedance or perform impedance bridging between the device and a non-associated network to ensure appropriate audio signal level input to a radio and/or the signal output from the radio. The USRG 510 can facilitate remote configuration and monitoring to lower (e.g., minimize) user interaction at fielded locations and providing device status. This implementation can lower (e.g., minimize) the ability of an adversary desiring to reverse engineer specific aspects of an implemented USRG 510 and therefore increase security. Further, the USRG 510 can use a speech translation algorithm so that an input audio signal is translated prior to being sent to the destination output interface in the language selected within the profile corresponding to that output. The selection of the language the received audio is to be translated to can be chosen manually via the user interface of the USRG 510 or be performed proactively by having an initial training session where the speaker keys their radio and speaks a phrase in the desired language, the USRG 510 samples the speech, runs the sample through the speech recognition algorithm, and then proactively selects the language to which the speech is to be translated. The USRG 510 can also employ an algorithm which when initializing the interfaces, sends audio to the user from within the USRG 510 asking that the user key the radio without speaking for a specified time period and to release a Push-To-Talk capability afterward. This can provide for an initial calibration of the background noise that is being experienced at the far end radio. The background noise sampled can be used by the USRG 510 to adjust the speech templates to increase accuracy of the speech recognition algorithm.

To increase (e.g., maximize) power transfer by the USRG 510 from an output source such as an amplifier to an external load, the impedance of the load can match that of the output source. Power transfer improvement (e.g., optimization) can be achieved when the impedance of the amplifier is about equal to the complex conjugate of the external load. An impedance mismatch can degrade the output signal leading it to be distorted, causing additional power demands on the output source, and thus causing additional noise. For example, when the load impedance is too low, it increases the current demands on the output source to drive the load at a desired level potentially leading to increased heating of the amplifier resulting in decreased service life. Techniques discussed above can improve power transfer. Another consideration is for the desire to improve (e.g., maximize) the voltage level output as measured at a load. This is can be achieved via impedance bridging. The USRG 510 can perform this function in both a manual or automatic fashion.

The USRG 510 can function to facilitate communication across disparate radio networks independent of frequency, waveform, encryption, or other factors causing two or more radios to not be able to communicate. Additionally, the USRG 510 can provide the ability to ingest audio from a radio physically connected to one of its ports, recognize the language that has been spoken, perform a translation of the speech to a second language, and send the translated audio to the desired port to be output to a second radio on another network. The second radio then transmits the audio information along the associated network in the newly translated language. While discussed in a two-network and two-langue context, aspects can be practiced that provide this capability to a multitude of radios and performs translation of a multitude of languages. The USRG 510 can have an ability to store and recall settings and connection profiles where the connection profiles can include information about a particular radio's impedance characteristics and instructions which can be applied to the impedance matching algorithm built into the USRG and employed to provide an improved (e.g., optimized) impedance match or impedance bridged connection with the subject radio when it is connected to a particular port. This capability can be achieved via manual interaction or via algorithms and circuitry able to be controlled via the USRG's installed algorithm and executed by the USRG's processor and circuitry.

The USRG 510 can proactively translate received text into the native language of a partner whose radio is connected on an audio port of the USRG 510. This capability relieves the need for a human translator thus freeing up personnel for other duties, such as translating live conversation. The USRG 510 translation of text can be used as an aspect of speech translation.

The USRG 510 can facilitate user configuration via a display with physical buttons, a touch screen display, or a web browser. The USRG 510 can have different levels of access and can be controlled via role based access that can be managed by way of the display. In one example, an administrator can have full access to configure all capabilities of the USRG 510 where a maintainer can have access to a smaller subset of capabilities. A third level user can be limited to permission to associate profiles with specific I/O interfaces or view configuration settings. The USRG 510 can securely store credentials such that personnel attempting to obtain access to the USRG 510 can log in locally for a USRG 510 that is not connected to a network (e.g., when connected to a network, the default can be for non-local credential verification).

When connecting an audio signal source to an audio signal input, the USRG 510 can take care to ensure the level of the signal input to the destination does not cause the signal to be distorted which would lead to the audio signal being difficult to understand by the destination or for it to be unintelligible. If the input impedance of the destination is not properly matched with the output impedance of the audio source, issues that adversely affect performance may be experienced. For example, if the destination's impedance is significantly lower than the output impedance of the audio source, it may cause the signal voltage to be pulled down and the amplifier to utilize more current in an attempt to provide an audio signal of adequate level. This may cause the audio source's amplifier to generate additional heat which may degrade the audio amplifier and ultimately lead to system failure. Impedance characteristics of radios may vary among different manufacturers and models. The USRG 510 can facilitate satisfactory audio connections between the radios by matching the impedance using discreet or programmable active, passive, or a combination thereof components to provide a satisfactory impedance match. This can be invoked by using a preconfigured profile containing settings for the impedance matching or bridging component 530 or via an algorithm which utilizes a known voltage produced by the USRG 510 and proactively determining a match (e.g., best match) for the output impedance of the USRG 510. Example implementations can include connecting the audio destination to the USRG 510, utilizing a known output voltage level, and determining when the voltage measured across the impedance matching or bridging component 530 is half that of the audio destination. In this, the impedance match can be derived via a voltage divider circuit. For example, the voltage can be sampled and calculated through analog to digital conversion. Once converted, the USRG 510 can calculate the voltage and compare the voltage to a known voltage. Another manner can be to utilize a Wheatstone bridge circuit (e.g., of the USRG 510) to determine when the impedance of the audio out amplifier matches the input impedance of the destination audio load. This could be utilized for primarily resistive implementations of the USRG 510. The USRG 510 can be configured to measure the voltage across the bridge and when it is 0 Volts or when it is within a predetermined match value (e.g., best match within a tolerance), the impedance would be set and can now be used to provide a satisfactory signal. This can allow achievement of preferred (e.g., maximum) power transfer.

In one embodiment, the audio output amplifier does not provide maximum power transfer, but instead drives a high impedance circuit. This can be the impedance bridging (e.g., instead of impedance matching). Overvoltage protection can be included in the design to minimize chances of driving a load at too high a voltage. This can be implemented through the use of electrical components such as using diodes or implemented via software algorithm where the output voltage is clamped utilizing a software program to control the output voltage level, control a programmable resistor, or some combination thereof.

The USRG 510 can have various capabilities discussed in this paragraph that can be individually implemented or implemented in at least partial combination. The USRG 510 can comprise circuitry facilitating the ability to load, securely store, and execute software routines to perform various functions disclosed herein. The USRG 510 can perform full disk encryption which can only be decrypted when the USRG 510 is presented with a valid secure token. The USRG 510 can store and retrieve profiles which are used to configure radio interfaces to which they are applied resulting in improved (e.g., optimized) connectivity characteristics with respect to impedance and signal level. This information can be used to adjust the programmable electronics without developing and adding customized circuitry. The USRG 510 can ensure appropriate audio signal level input between radios by proactively improving the impedance match between the audio interface connections between the radio and USRG's radio interface. The USRG 510 can ensure integrity of operating system software via a secure key storage used to verify the validity of the software. The USRG 510 can include a Role Association Token interface which when not presented with the requisite credentials, renders the USRG 510 inoperable, minimally administrable, un-administrable, or others. The USRG 510 can support Full Disk Encryption protecting against the installation of malware or accessing unencrypted software when not in service and can also provide role based access. The USRG 510 can perform speech translation to provide proactive translation of incoming audio streams and to translate the audio into the desired language prior to outputting the audio stream to the desired radio. The USRG 510 can translate an incoming audio stream, translate the audio to multiple languages, and output the translated audio streams to the desired interface based on the profile settings for that interface. The USRG 510 can be remotely or locally administered and provide status updates on itself or radios associated herein, such as sending alerts upon error and tamper conditions for itself. The USRG 510 can generate algorithmically created entropy to modify the incoming and outgoing audio streams. The USRG 510 can use GPS position data to increase the accuracy of the speech recognition algorithm. A default speech translation option list prioritization of the USRG 510 can be proactively updated by location services via the onboard GPS. The display 511 of the USRG 510 can be made of a touch sensitive material (e.g., resistive or capacitive) allowing users to invoke functionality via surface pressure being exerted upon the display 511, such as a drag and drop language port selection via a touch sensitive screen. The display 511 can be used as a manner of authentication as it can support finger swipe patterns in addition to other authentication such as the entering of a Personal Identification Number (PIN) or passphrase. The PIN keyboard that can manifest upon the display 511 can be configured to change randomly to minimize the possibility of the PIN being compromised by other entities within visual proximity. The display 511 can change the location of the American Standard Code for Information Interchange (ASCII) characters within a keyboard between login attempts to reduce a possibility of the passphrase or PIN being compromised by entities within visual proximity of the USRG 510.

Figure 6:
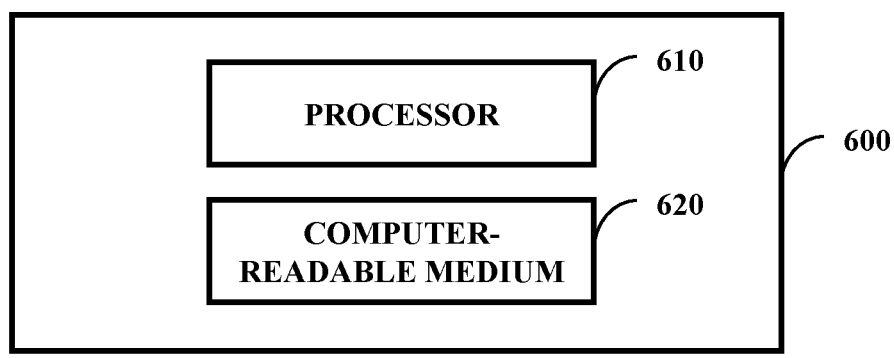
FIG. 6 illustrates one embodiment of a system comprising a processor and a computer-readable medium.

FIG. 6 illustrates one embodiment of a system 600 comprising a processor 610 and a computer-readable medium 620 (e.g., non-transitory computer-readable medium). In one embodiment, the computer-readable medium 620 is communicatively coupled to the processor 610 and stores a command set executable by the processor 610 to facilitate operation of at least one component disclosed herein (e.g., the bridge component 130 of FIG. 1). In one embodiment, at least one component disclosed herein (e.g., the language component 420 of FIG. 4) can be implemented, at least in part, by way of non-software, such as implemented as hardware by way of the system 600. In one embodiment, the computer-readable medium 620 is configured to store processor-executable instructions that when executed by the processor 610, cause the processor 610 to perform at least part of a method disclosed herein (e.g., at least part of one of the methods 700 or 800 discussed below).

Figure 7:
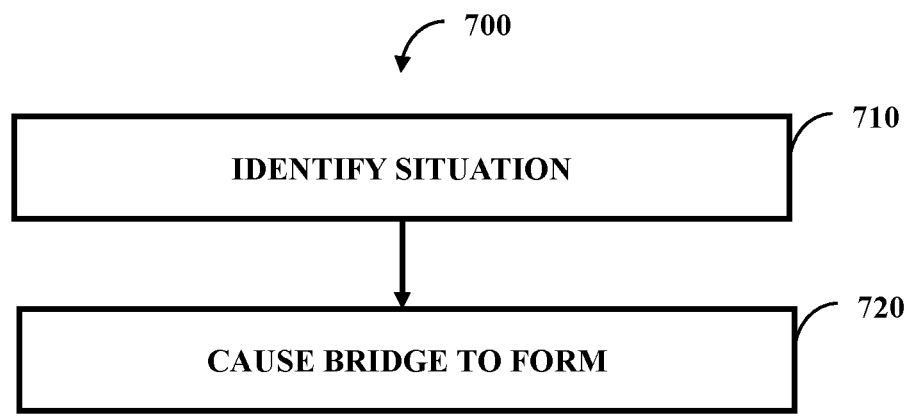
FIG. 7 illustrates one embodiment of a method comprising two actions.

FIG. 7 illustrates one embodiment of a method 700 comprising two actions 710-720. At 710, a situation can be identified that indicates that bridge 160 of FIG. 1 should form. In one example, a radio of the first network 140 of FIG. 1 can plug into the first engagement component 110 of FIG. 1 and a radio of the second network 150 of FIG. 1 can plug into the second engagement component 120 of FIG. 1. Proactively (e.g., automatically), upon the radios being plugged in, the bridge 160 of FIG. 1 can be formed at 720 (e.g., performed by the bridge component 130 of FIG. 1).

Figure 8:
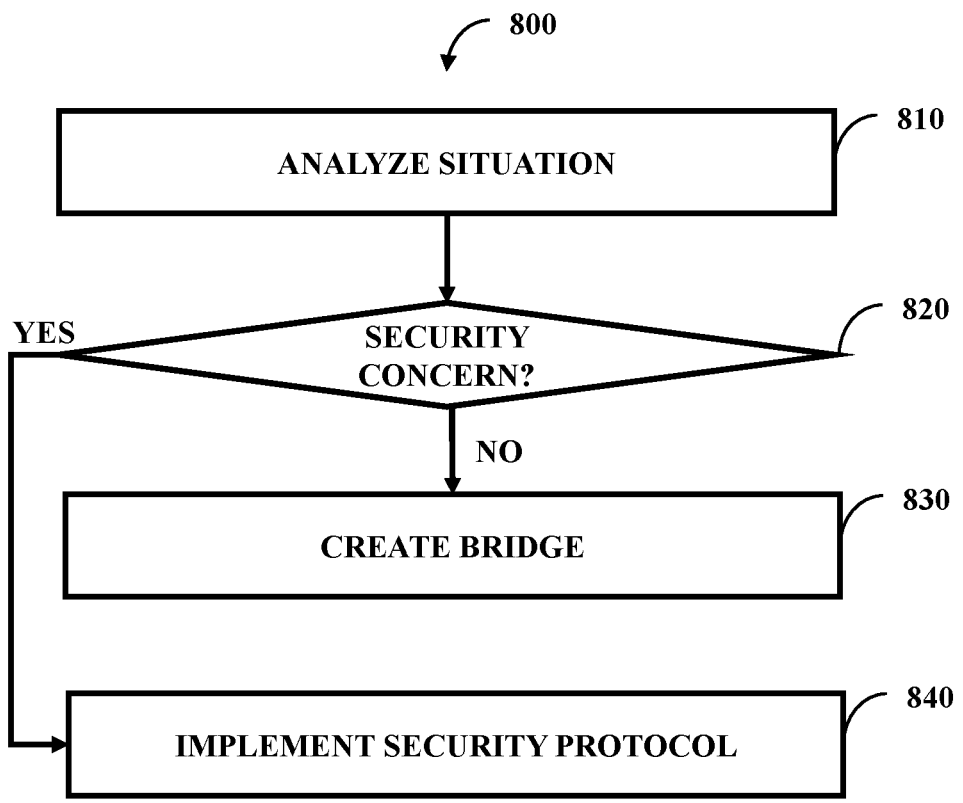
FIG. 8 illustrates one embodiment of a method comprising four actions.

FIG. 8 illustrates one embodiment of a method 800 comprising four actions 810-840. At 810 a situation can be analyzed, such as a situation indicated by an explicit user request to form the bridge 160 of FIG. 1. A check can occur at 820 to determine if the situation has any known security threats. In one example, the check 820 can include determining if a housing had been tampered with; if not, then the bridge 160 of FIG. 1 can be created at 830 and if so, then a security protocol can be implemented at 840.

The security protocol can be that the bridge 160 of FIG. 1 is not created. However, other enactments can occur. In one example, a message can be highly critical, such as a distress signal in an emergency situation. Therefore, the action 840 can include creation of the bridge 160 of FIG. 1, but in a limited circumstance, such as just long enough for the distress signal to be transferred from the first network 140 of FIG. 1 to the second network 150 of FIG. 1.

While the methods disclosed herein are shown and described as a series of blocks, it is to be appreciated by one of ordinary skill in the art that the methods are not restricted by the order of the blocks, as some blocks can take place in different orders.

What is claimed is:

1. A non-transitory computer-readable medium, communicatively coupled to a processor, configured to store a command set executable by the processor to effectuate operation of a component set, the component set comprising:
   a first engagement component configured to engage with a first communication network;
   a second engagement component configured to engage with a second communication network;
   a bridge component configured to form a bridge between the first communication network and the second communication network;
   a global position component configured to identify a global position that pertains to the bridge component;
   an assignment component configured to assign a send language to a communication from the first communication network to the second communication network, the send language being based, at least in part, on the global position;
   a determination component configured to determine if the send language matches a receive language of the second communication network;
   a conversion component configured to convert the communication from the send language to the received language if the determination is that they do not match; and
   a transfer component configured to cause the converted communication to transfer to the second communication network when the determination is that they do not match and configured to cause the communication to transfer to the second communication network absent conversion when the determination is that they do match,
   where the first communication network and the second communication network are incompatible absent the bridge,
   where the bridge effectuates communication between the first communication network and the second communication network such that the first communication network and the second communication network are compatible,
   where the first engagement component, the second engagement component, the bridge component, the assignment component, the determination component, the conversion component, the transfer component, the global positioning component, or a combination thereof is implemented, at least in part, by way of non-software.

2. The non-transitory computer-readable medium of claim 1, the component set comprising:
   a first impedance identification component configured to identify a first impedance of the first communication network; and
   a second impedance identification component configured to identify a second impedance of the second communication network,
   where the first impedance and the second impedance indicate an impedance mismatch and
   where the bridge compensates for the impedance mismatch.

3. The non-transitory computer-readable medium of claim 1, the component set comprising:
   a first voltage identification component configured to identify a first voltage of the first communication network; and
   a second voltage identification component configured to identify a second voltage of the second communication network,
   where the first voltage and the second voltage indicate a voltage mismatch and
   where the bridge compensates for the voltage mismatch.

4. The non-transitory computer-readable medium of claim 1, the component set comprising:
   a first gain identification component configured to identify a first gain of the first communication network; and
   a second gain identification component configured to identify a second gain of the second communication network,
   where the first gain and the second gain indicate a gain mismatch and
   where the bridge compensates for the gain mismatch.

5. The non-transitory computer-readable medium of claim 1,
   where the first engagement component, the second engagement component, and the bridge component are implemented upon a communication device of the first communication network and a communication device of the second communication network.

6. A non-transitory computer-readable medium, communicatively coupled to a processor, configured to store a command set executable by the processor to effectuate operation of a component set, the component set comprising:
   a first engagement component configured to engage with a first communication network;
   a second engagement component configured to engage with a second communication network;
   a bridge component configured to form a bridge between the first communication network and the second communication network;
   a check component configured to perform a software security check on software associated with the bridge component; and
   a break component configured to break the bridge in response to a failure indication from the software security check,
   where the first communication network and the second communication network are incompatible absent the bridge,
   where the bridge effectuates communication between the first communication network and the second communication network such that the first communication network and the second communication network are compatible, and
   where the first engagement component, the second engagement component, the bridge component, the check component, the break component, or a combination thereof is implemented, at least in part, by way of non-software.

7. The non-transitory computer-readable medium of claim 6, the component set comprising:
an overcurrent identification component configured to identify that a current sent from the first communication network to the second communication network is above a threshold; and
a current protection component configured to prevent the current that is above the threshold from reaching the second communication network.

8. The non-transitory computer-readable medium of claim 6, the component set comprising:
an overvoltage identification component configured to identify that a voltage sent from the first communication network to the second communication network is above a threshold; and
a voltage protection component configured to prevent the voltage that is above the threshold from reaching the second communication network.

9. The non-transitory computer-readable medium of claim 6, the component set comprising:
an assessment component configured to assess a content of a communication from the first communication network to the second communication network to produce an assessment result; and
a filter component configured to perform a filter of the content based, at least in part on, the assessment result, where the filtered content transfers to the second communication network.

10. The non-transitory computer-readable medium of claim 6, the component set comprising:
a content analysis component configured to perform a content analysis of a communication from the first network to the second network to produce a content analysis result;
a decision component configured to make a determination if the communication should transfer to the second network based, at least in part, on the content analysis result; and
a block component configured to prevent the communication from reaching the second network when the determination is that the communication should not transfer to the second network.

11. A non-transitory computer-readable medium, communicatively coupled to a processor, configured to store a command set executable by the processor to effectuate operation of a component set, the component set comprising:
a first engagement component configured to engage with a first communication network;
a second engagement component configured to engage with a second communication network;
a bridge component configured to form a bridge between the first communication network and the second communication network;
a pitch evaluation component configured to perform a pitch evaluation of a communication from the first network to the second network to produce a pitch evaluation result;
a decision component configured to make a determination if the communication should transfer to the second network based, at least in part, on the pitch evaluation result; and
a block component configured to prevent the communication from reaching the second network when the determination is that the communication should not transfer to the second network,
where the first communication network and the second communication network are incompatible absent the bridge,
where the bridge effectuates communication between the first communication network and the second communication network such that the first communication network and the second communication network are compatible, and
where the first engagement component, the second engagement component, the bridge component, the pitch component, the decision component, the block component, or a combination thereof is implemented, at least in part, by way of non-software.

12. A non-transitory computer-readable medium, communicatively coupled to a processor, configured to store a command set executable by the processor to effectuate operation of a component set, the component set comprising:
a first engagement component configured to engage with a first communication network;
a second engagement component configured to engage with a second communication network;
a bridge component configured to form a bridge between the first communication network and the second communication network;
a monitor component configured to monitor the first engagement component, the second engagement component, and the bridge component to produce a monitor result;
a security component configured to scrutinize the monitor result such that a determination is made on if a security violation occurs; and
a block component configured to, at least in part, block communication between the first communication network and the second communication network when the determination is that a security violation occurs,
where the first communication network and the second communication network are incompatible absent the bridge,
where the bridge effectuates communication between the first communication network and the second communication network such that the first communication network and the second communication network are compatible
where the first engagement component, the second engagement component, the bridge component, the monitor component, the security component, the block component, or a combination thereof is implemented, at least in part, by way of non-software.

13. A non-transitory computer-readable medium, communicatively coupled to a processor, configured to store a command set executable by the processor to effectuate operation of a component set, the component set comprising:
a first engagement component configured to engage with a first communication network;
a second engagement component configured to engage with a second communication network;
a bridge component configured to form a bridge between the first communication network and the second communication network;
a lock component configured to lock the bridge component from operation; and
an interface component configured to receive a valid unlock instruction for the bridge component, where the first communication network and the second communication network are incompatible absent the bridge, where the bridge effectuates communication between the first communication network and the second communication network such that the first communication network and the second communication network are compatible, where the lock component unlocks the bridge component for operation in response to reception of the valid unlock instruction, where the bridge component forms the bridge after being unlocked for operation, and where the first engagement component, the second engagement component, the bridge component, the lock component, the interface component, or a combination thereof is implemented, at least in part, by way of non-software.

14. The non-transitory computer-readable medium of claim 13, the component set comprising:
an assignment component configured to assign a send language to a communication from the first communication network to the second communication network;
a determination component configured to determine if the send language matches a receive language of the second communication network;
a conversion component configured to convert the communication from the send language to the received language if the determination is that they do not match; and
a transfer component configured to cause the converted communication to transfer to the second communication network when the determination is that they do not match and configured to cause the communication to transfer to the second communication network absent conversion when the determination is that they do match.

15. The non-transitory computer-readable medium of claim 14, the component set comprising:
an analysis component configured to perform a language analysis on the communication to produce an analysis result,
where the assignment component assigns the send language based, at least in part, on the analysis result.

16. The non-transitory computer-readable medium of claim 13, the component set comprising:
a first impedance identification component configured to identify a first impedance of the first communication network;
a second impedance identification component configured to identify a second impedance of the second communication network;
a first voltage identification component configured to identify a first voltage of the first communication network;
a second voltage identification component configured to identify a second voltage of the second communication network;
a first gain identification component configured to identify a first gain of the first communication network; and
a second gain identification component configured to identify a second gain of the second communication network,
where the first gain and the second gain indicate a gain mismatch,
where the bridge compensates for the gain mismatch,
where the first voltage and the second voltage indicate a voltage mismatch,
where the bridge compensates for the voltage mismatch,
where the first impedance and the second impedance indicate an impedance mismatch, and
where the bridge compensates for the impedance mismatch.

17. A non-transitory computer-readable medium, communicatively coupled to a processor, configured to store a command set executable by the processor to effectuate operation of a component set, the component set comprising:
a first engagement component configured to engage with a first communication network;
a second engagement component configured to engage with a second communication network;
a bridge component configured to form a bridge between the first communication network and the second communication network;
a profile component configured to determine a profile associated with the second communication network; and
a data component configured to access a data set that corresponds to the profile,
where the first communication network and the second communication network are incompatible absent the bridge,
where the bridge effectuates communication between the first communication network and the second communication network such that the first communication network and the second communication network are compatible,
where the bridge component employs the data set in formation of the bridge, and
where the first engagement component, the second engagement component, the bridge component, the profile component, the data component, or a combination thereof is implemented, at least in part, by way of non-software.

18. The non-transitory computer-readable medium of claim 17, the component set comprising:
a first impedance identification component configured to identify a first impedance of the first communication network;
a second impedance identification component configured to identify a second impedance of the second communication network;
a first voltage identification component configured to identify a first voltage of the first communication network;
a second voltage identification component configured to identify a second voltage of the second communication network;
a first gain identification component configured to identify a first gain of the first communication network; and
a second gain identification component configured to identify a second gain of the second communication network,
where the first gain and the second gain indicate a gain mismatch,
where the bridge compensates for the gain mismatch,
where the first voltage and the second voltage indicate a voltage mismatch,
where the bridge compensates for the voltage mismatch,
where the first impedance and the second impedance indicate an impedance mismatch, and where the bridge compensates for the impedance mismatch.

19. A non-transitory computer-readable medium, communicatively coupled to a processor, configured to store a command set executable by the processor to effectuate operation of a component set, the component set comprising:
- a first engagement component configured to engage with a first communication network;
- a second engagement component configured to engage with a second communication network;
- a bridge component configured to form a bridge between the first communication network and the second communication network;
- a profile determination component configured to determine that a profile is not available for the second communication network;
- an evaluation component configured to evaluate the bridge to produce a bridge evaluation result;
- a creation component configured to create a profile for the second communication network based, at least in part, on the bridge evaluation result; and
- a storage component configured to cause the profile to be stored,
- where the first communication network and the second communication network are incompatible absent the bridge,
- where the bridge effectuates communication between the first communication network and the second communication network such that the first communication network and the second communication network are compatible, and
- where the first engagement component, the second engagement component, the bridge component, the profile component, the evaluation component, the creation component, the storage component, or a combination thereof is implemented, at least in part, by way of non-software.

20. The non-transitory computer-readable medium of claim 19, the component set comprising:
- a first impedance identification component configured to identify a first impedance of the first communication network;
- a second impedance identification component configured to identify a second impedance of the second communication network;
- a first voltage identification component configured to identify a first voltage of the first communication network;
- a second voltage identification component configured to identify a second voltage of the second communication network;
- a first gain identification component configured to identify a first gain of the first communication network; and
- a second gain identification component configured to identify a second gain of the second communication network,
- where the first gain and the second gain indicate a gain mismatch,
- where the bridge compensates for the gain mismatch,
- where the first voltage and the second voltage indicate a voltage mismatch,
- where the bridge compensates for the voltage mismatch,
- where the first impedance and the second impedance indicate an impedance mismatch, and
- where the bridge compensates for the impedance mismatch.

* * * * *